US012567640B2

(12) United States Patent
Uchiyama et al.

(10) Patent No.: US 12,567,640 B2
(45) Date of Patent: Mar. 3, 2026

(54) BATTERY CASE

(71) Applicant: TOYOTA JIDOSHA KABUSHIKI KAISHA, Toyota (JP)

(72) Inventors: Toshio Uchiyama, Toyota (JP); Kazuo Ebata, Toyota (JP); Takashi Murata, Kasugai (JP); Yo Yamamoto, Nagoya (JP); Masahiro Misu, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 634 days.

(21) Appl. No.: 18/091,689

(22) Filed: Dec. 30, 2022

(65) Prior Publication Data

US 2023/0291057 A1     Sep. 14, 2023

(30) Foreign Application Priority Data

Mar. 14, 2022     (JP) ................................. 2022-039292

(51) Int. Cl.
H01M 50/264          (2021.01)
H01M 50/209          (2021.01)
(52) U.S. Cl.
CPC ....... H01M 50/264 (2021.01); H01M 50/209 (2021.01)

(58) Field of Classification Search
None
See application file for complete search history.

(56)                References Cited

U.S. PATENT DOCUMENTS

2022/0013852 A1     1/2022   Suenaga et al.
2023/0072733 A1*    3/2023   Yokoyama ........ H01M 10/6562

FOREIGN PATENT DOCUMENTS

JP          2018-120715 A     8/2018
JP          2020-087750 A     6/2020

* cited by examiner

*Primary Examiner* — Wyatt P Mcconnell
(74) *Attorney, Agent, or Firm* — Dinsmore & Shohl LLP

(57)                ABSTRACT

A battery case includes L-shaped plates. One L-shaped plate is composed of a bottom part and a wall part. The bottom part is located between base ends of support pillar members and a bottom plate and joined to the bottom plate. The wall part is placed against outer lateral surfaces of the support pillar members and mechanically joined to these outer lateral surfaces. Another L-shaped plate is composed of a bottom part and a wall part. The bottom part is located between base ends of support pillar members and the bottom plate and joined to the bottom plate. The wall part is placed against outer lateral surfaces of the support pillar members and mechanically joined to these outer lateral surfaces.

5 Claims, 4 Drawing Sheets

BATTERY CASE

CROSS-REFERENCE TO RELATED APPLICATION

This application claims priority to Japanese Patent Application No. 2022-039292 filed on Mar. 14, 2022, incorporated herein by reference in its entirety.

BACKGROUND

1. Technical Field

This disclosure relates to a battery case that houses a battery stack.

2. Description of Related Art

Japanese Unexamined Patent Application Publication No. 2020-87750 (JP 2020-87750 A) discloses a battery case that houses a battery stack. This conventional battery case has a hexahedral shape, and includes frames forming the framework of the hexahedron and six cover panels respectively covering six openings of the frames. The cover panels are each mounted to outer lateral surfaces of the frames to constitute the respective surfaces of the hexahedron.

Three support pillars extending in a vertical direction are provided on a front side of the battery case, between two support pillars constituting the frames. One support pillar extending in a horizontal direction is placed on a rear side of the battery case, across two support pillars constituting the frames. Further, on the rear side of the battery case, between the two support pillars constituting the frames, another support pillar is placed across the support pillar extending in the horizontal direction and a frame provided parallel to that support pillar. These support pillars function as reinforcing members for the frames.

Other than JP 2020-87750 A, Japanese Unexamined Patent Application Publication No. 2018-120715 (JP 2018-120715 A) can be cited as an example of literatures showing the state of the art in a technical field relating to this disclosure.

SUMMARY

JP 2020-87750 A mentions that the battery case may be installed in a vehicle or may be provided in a place other than a vehicle. Here, one conceivable place other than a vehicle is outdoors. However, a battery case installed outdoors is likely to vibrate violently in the event of an earthquake, and is also likely to be hit by flying objects. Thus, especially a battery case installed outdoors is required to have high strength to resist external forces, which makes it safe to say that the conventional battery case leaves room for improvement.

One object of this disclosure is to enhance the strength of a battery case that houses a battery stack.

A first aspect of this disclosure is a battery case, which has the following characteristics.

The battery case houses a battery stack. The battery case includes at least four support pillar members, a bottom plate, and L-shaped plates.

The at least four support pillar members are disposed so as to correspond to at least four corners of the battery stack. The at least four support pillar members each extend in a vertical direction. The bottom plate is disposed on the base end side of the at least four support pillar members. The bottom plate supports the battery stack and the at least four support pillar members. The L-shaped plates are composed of bottom parts and wall parts. The bottom parts are located between base ends of the at least four support pillar members and the bottom plate. The wall parts rise from the bottom parts and contact at least four outer lateral surfaces belonging to the respective at least four support pillar members.

The at least four outer lateral surfaces include at least two left outer lateral surfaces and at least two right outer lateral surfaces. The at least two left outer lateral surfaces are located on the left side of the battery stack. The at least two right outer lateral surfaces are located on the right side of the battery stack.

The L-shaped plates include a left L-shaped plate and a right L-shaped plate. The left L-shaped plate is located on the left side of the battery stack. The right L-shaped plate is located on the right side of the battery stack.

The left L-shaped plate is placed against the at least two left outer lateral surfaces. The right L-shaped plate is placed against the at least two right outer lateral surfaces.

The bottom plate and each of the bottom parts of the left and right L-shaped plates are joined together.

The wall part of the left L-shaped plate and the at least two left outer lateral surfaces are joined together. The wall part of the right L-shaped plate and the at least two right outer lateral surfaces are joined together.

A second aspect of this disclosure further has the following characteristics in the first aspect.

The battery case further includes a pair of reinforcing members and an additional reinforcing member. The pair of reinforcing members is provided on a lower surface of the bottom plate. The pair of reinforcing members extends in the longitudinal direction of the battery stack. The additional reinforcing member extends between the pair of reinforcing members in a direction orthogonal to the longitudinal direction.

The lower surface of the bottom plate and each of the pair of reinforcing members and the additional reinforcing member are joined together.

A third aspect of this disclosure further has the following characteristics in the first or second aspect.

The battery case further includes an upper-tier plate and at least two upper-tier support members. The upper-tier plate is provided above the bottom plate. The upper-tier plate supports an electronic component that controls charge and discharge of the battery stack. The at least two upper-tier support members extend in a direction orthogonal to the longitudinal direction of the battery stack and support the upper-tier plate.

The at least four support pillar members include at least two pairs of support pillar members each making a pair in the direction orthogonal to the longitudinal direction.

Each of the at least two pairs of support pillar members is coupled together through the at least two upper-tier support members.

A fourth aspect of this disclosure further has the following characteristics in the third aspect.

The battery case further includes a middle-tier plate and at least two middle-tier support members. The middle-tier plate is provided between the bottom plate and the upper-tier plate. The middle-tier plate supports an additional battery stack. The at least two middle-tier support members extend in the direction orthogonal to the longitudinal direction and support the middle-tier plate.

Each of the at least two pairs of support pillar members is coupled together through the at least two middle-tier support members.

A fifth aspect of this disclosure further has the following characteristics in any one of the first to fourth aspects.

The bottom plate and each of the bottom parts of the left and right L-shaped plates are welded together.

The wall part of the left L-shaped plate and the at least two left outer lateral surfaces are mechanically joined together.

The wall part of the right L-shaped plate and the at least two right outer lateral surfaces are mechanically joined together.

According to the first aspect, the battery case including the left L-shaped plate and the right L-shaped plate is provided. The left L-shaped plate is placed against the at least two left outer lateral surfaces located on the left side of the battery stack, and the right L-shaped plate is placed against the at least two right outer lateral surfaces located on the right side of the battery stack. Each of the left and right L-shaped plates is composed of the bottom part and the wall part, and their bottom parts are each joined to the bottom plate supporting the battery stack and the at least four support pillar members. Further, the wall part of the left L-shaped plate is joined to the at least two left outer lateral surfaces, and the wall part of the right L-shaped plate is joined to the at least two right outer lateral surfaces. Thus, the left L-shaped plate and the right L-shaped plate are firmly joined to the bottom plate and the at least four support pillar members, which enhances the rigidity of these battery case members. Therefore, the strength of the battery case can be enhanced.

According to the second aspect, the battery case further including the pair of reinforcing members and the additional reinforcing member is provided. The pair of reinforcing members is provided on the lower surface of the bottom plate and extends in the longitudinal direction of the battery stack. The additional reinforcing member extends between the pair of reinforcing members in the direction orthogonal to the longitudinal direction. Further, the lower surface of the bottom plate and each of the pair of reinforcing members and the additional reinforcing member are joined together. Thus, the pair of reinforcing members and the additional reinforcing member are firmly joined to the bottom plate, which enhances the rigidity of the bottom plate. Therefore, the strength of the battery case can be further enhanced.

According to the third aspect, the battery case further including the upper-tier plate and the at least two upper-tier support members is provided. The upper-tier plate is provided above the bottom plate. The at least two upper-tier support members extend in the direction orthogonal to the longitudinal direction of the battery stack and support the upper-tier plate. Further, each of the at least two pairs of support pillar members making pairs in the direction orthogonal to the longitudinal direction is coupled together through the at least two upper-tier support members. Thus, the at least two pairs of support pillar members are coupled together by the at least two upper-tier support members, which enhances the rigidity of the at least two pairs of support pillar members. Therefore, the strength of the battery case can be further enhanced.

According to the fourth aspect, the battery case further including the middle-tier plate and the at least two middle-tier support members is provided. The middle-tier plate is provided between the bottom plate and the upper-tier plate. The at least two middle-tier support members extend in the direction orthogonal to the longitudinal direction and support the middle-tier plate. Further, each of the at least two pairs of support pillar members making pairs in the direction orthogonal to the longitudinal direction is coupled together through the at least two middle-tier support members. Thus, the at least two pairs of support pillar members are coupled together by the at least two middle-tier support members, which enhances the rigidity of the at least two pairs of support pillar members. Therefore, the strength of the battery case can be further enhanced.

According to the fifth aspect, the bottom plate and each of the bottom parts of the left and right L-shaped plates are welded together. Further, the wall part of the left L-shaped plate and the at least two left outer lateral surfaces are mechanically joined together, and the wall part of the right L-shaped plate and the at least two right outer lateral surfaces are mechanically joined together. Thus, each of the left L-shaped plate and the right L-shaped plate can be firmly joined to the bottom plate and the at least four support pillar members.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
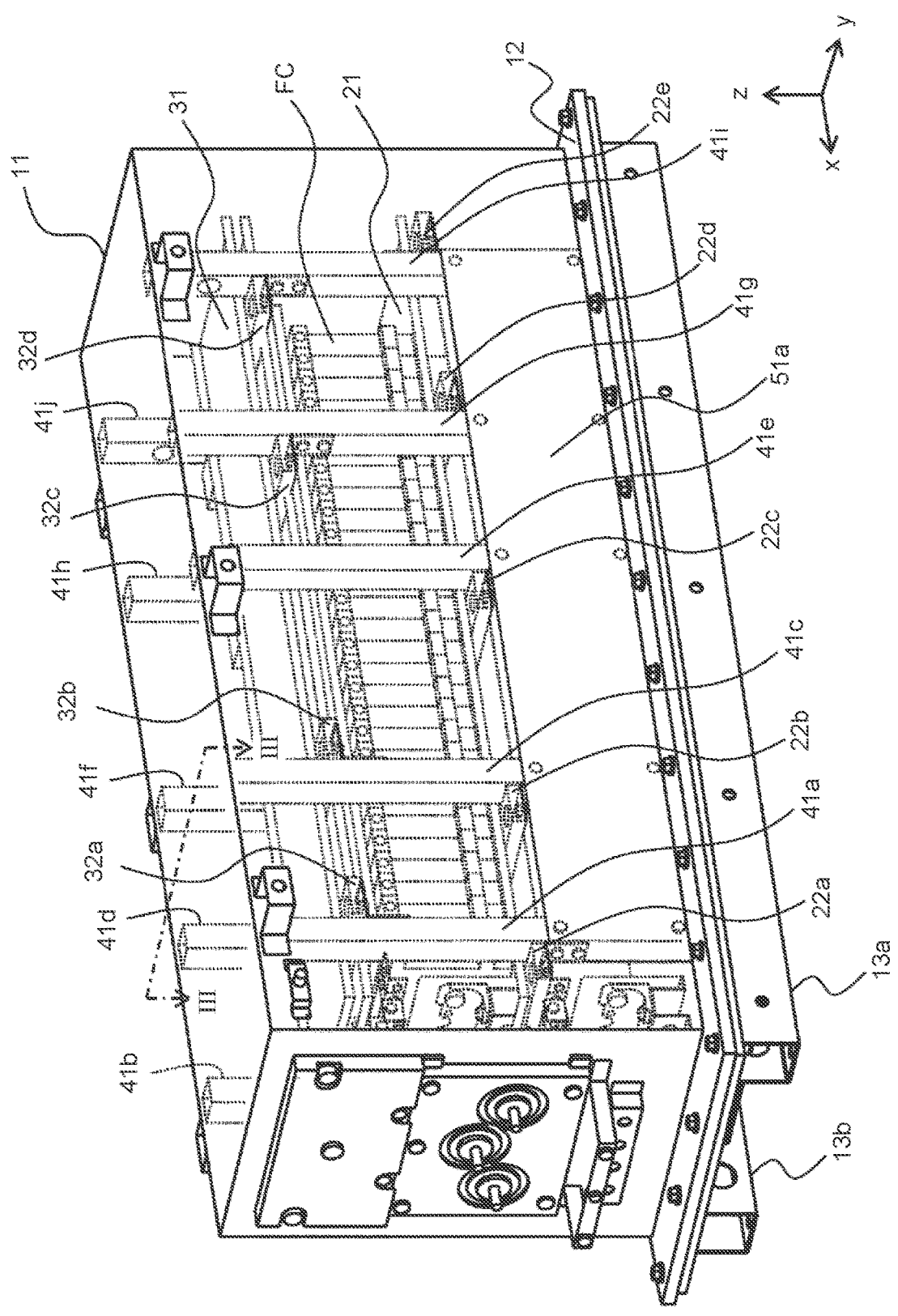
FIG. 1 is a perspective view showing an example of the configuration of a battery case according to an embodiment.

A battery case according to an embodiment will be described below with reference to the drawings. Parts in the drawings that are the same or equivalent are denoted by the same reference sign, and the description thereof will be simplified or omitted.

1. Example of Overall Configuration of Battery Case

The battery case according to the embodiment is applied to, for example, a storage battery system for a small-scale facility, such as a general household or a grocery store. The battery case according to the embodiment is installed adjacent to the facility and supplies electricity to various electrical appliances or receives electricity from an external power source. FIG. 1 is a perspective view showing an example of the configuration of the battery case according to the embodiment. A positive direction along the x-axis shown in FIG. 1 indicates, for example, a front side of the battery case; a positive direction along the y-axis indicates, for example, a left side of the battery case; and a positive direction along the z-axis indicates, for example, an upper side of the battery case. This example of the positional relationship between the positive directions along the x-axis, the y-axis, and the z-axis and the battery case is the same in the other drawings.

In the example shown in FIG. 1, the battery case includes a battery cover 11. The battery cover 11 is formed in a box shape. A bottom part of the battery cover 11 is open, and an outer rim of the bottom part projects to a periphery of the battery cover 11 like eaves. This outer rim is mechanically joined (fixed with bolts) to a bottom plate 12. The bottom plate 12 is formed by, for example, a general-purpose flat bar (flat steel). The bottom part of the battery cover 11 is closed by this bottom plate 12.

In the example shown in FIG. 1, for the convenience of description, the configuration inside the battery case is depicted as seen through the battery cover 11. The inside of the battery case is composed of three tiers. A first tier (lower tier) and a second tier (middle tier) are separated by a plate 21, and the second tier (middle tier) and a third tier (upper tier) are separated by a plate 31. The plates 21, 31 are formed by, for example, general-purpose flat bars. In the second tier, a battery stack FC in which a plurality of cells is stacked is housed. The plate 31 corresponds to the "upper-tier plate" in this disclosure, and the plate 21 corresponds to the "middle-tier plate" in this disclosure. The battery stack FC corresponds to the "additional battery stack" in this disclosure.

A battery stack having the same configuration as the battery stack FC is also housed in the first tier. The battery stack housed in the first tier corresponds to the "battery stack" in this disclosure. However, this battery stack is hidden behind a back surface of an L-shaped plate 51*a* shown in FIG. 1. In the third tier, an electronic component (not shown) that controls charge and discharge of these battery stacks is housed.

In the example shown in FIG. 1, the battery case has a plurality of support pillar members 41 (support pillar members 41*a* to 41*j*). These support pillar members 41 are provided around the battery stack FC, and each support pillar member 41 extends in the z-axis direction (i.e., a vertical direction). These support pillar members 41 are formed by, for example, general-purpose extruded aluminum members. A leading end of each support pillar member 41 faces an inner surface of the battery cover 11. On the other hand, a base end of each support pillar member 41 faces an upper surface of the bottom plate 12. The support pillar members 41*a*, 41*c*, 41*e*, 41*g*, 41*i* are arrayed on the left side of the battery stack FC. On the other hand, the support pillar members 41*b*, 41*d*, 41*f*, 41*h*, 41*j* are arrayed on the right side of the battery stack FC.

The support pillar members 41*a*, 41*b* make a pair on the left and right sides of the battery stack FC. Similarly, the support pillar members 41*c*, 41*d* make a pair; the support pillar members 41*e*, 41*f* make a pair; the support pillar members 41*g*, 41*h* make a pair; and the support pillar members 41*i*, 41*j* make a pair. The total number of the support pillar members 41 is not limited to the number shown in FIG. 1 (ten). As long as the support pillar members 41 include at least support pillar members 41 corresponding to four corners of the battery stack FC (i.e., the support pillar members 41*a*, 41*b*, 41*i*, 41*j*), the total number of the support pillar members 41 can be arbitrarily changed. While it depends on the size of the battery stack FC, the strength of the battery case increases as the total number of the support pillar members 41 becomes larger.

2. Detailed Configuration of Battery Case

Figure 2:
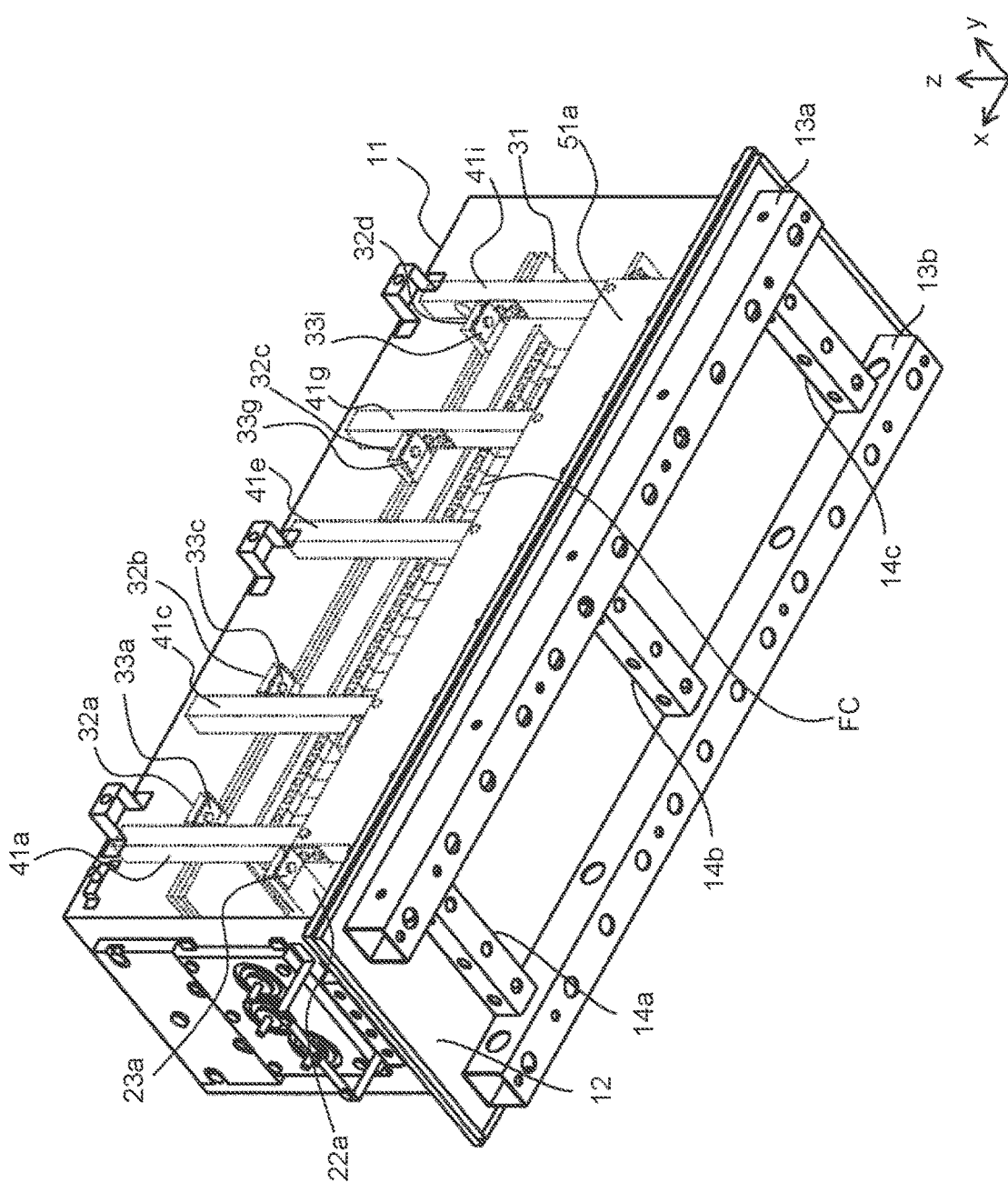
FIG. 2 is a view of the battery case shown in FIG. 1 as seen from the side of a bottom plate.

FIG. 2 is a view of the battery case shown in FIG. 1 as seen from the side of the bottom plate 12. As shown in FIG. 2, reinforcing members 13*a*, 13*b* are provided on a lower surface (back surface) of the bottom plate 12. The reinforcing members 13*a*, 13*b* extend in the x-axis direction (i.e., a front-rear direction of the battery case or a longitudinal direction of the battery stack FC). The reinforcing members 13*a*, 13*b* are formed by, for example, general-purpose rectangular steel pipes and joined to the lower surface of the bottom plate 12 (by spot welding, arc welding, laser welding, or the like). Thus, the rigidity of the bottom plate 12 in the x-axis direction (i.e., the front-rear direction of the battery case or the longitudinal direction of the battery stack FC) is enhanced.

A joint surface of the reinforcing member 13*a* faces respective base ends of the support pillar members 41*a*, 41*c*, 41*e*, 41*g*, 41*i*. On the other hand, a joint surface of the reinforcing member 13*b* faces respective base ends of the support pillar members 41*b*, 41*d*, 41*f*, 41*h*, 41*j*. The reinforcing members 13*a*, 13*b* make a pair and are mechanically joined (fixed with bolts) to a base (not shown) belonging to the facility.

A plurality of reinforcing members 14 (reinforcing members 14*a* to 14*c*) is provided between the reinforcing members 13*a* and 13*b*. These reinforcing members 14 are provided in a direction orthogonal (i.e., provided in the y-axis direction) to the extension direction of the reinforcing members 13*a*, 13*b* (i.e., the x-axis direction). These reinforcing members 14 are formed by, for example, general-purpose rectangular steel pipes and joined to the lower surface of the bottom plate 12 (by arc welding or the like). Thus, the rigidity of the bottom plate 12 in the y-axis direction (i.e., the left-right direction of the battery case) is enhanced. These reinforcing members 14 together with the reinforcing members 13*a*, 13*b* form a "grid structure." As the grid structure is formed, the rigidity of the bottom plate 12 in the y-axis direction (i.e., the left-right direction of the battery case) is also enhanced.

The reinforcing members 14*a* to 14*c* correspond to the "additional reinforcing member" in this disclosure. The total number of the reinforcing members 14 is not limited to the number shown in FIG. 2 (three). That is the total number of the reinforcing members 14 may be one, two, or four or more. While it depends on the size of the battery stack FC, the strength of the battery case increases as the total number of the reinforcing members 14 becomes larger.

Figure 3:
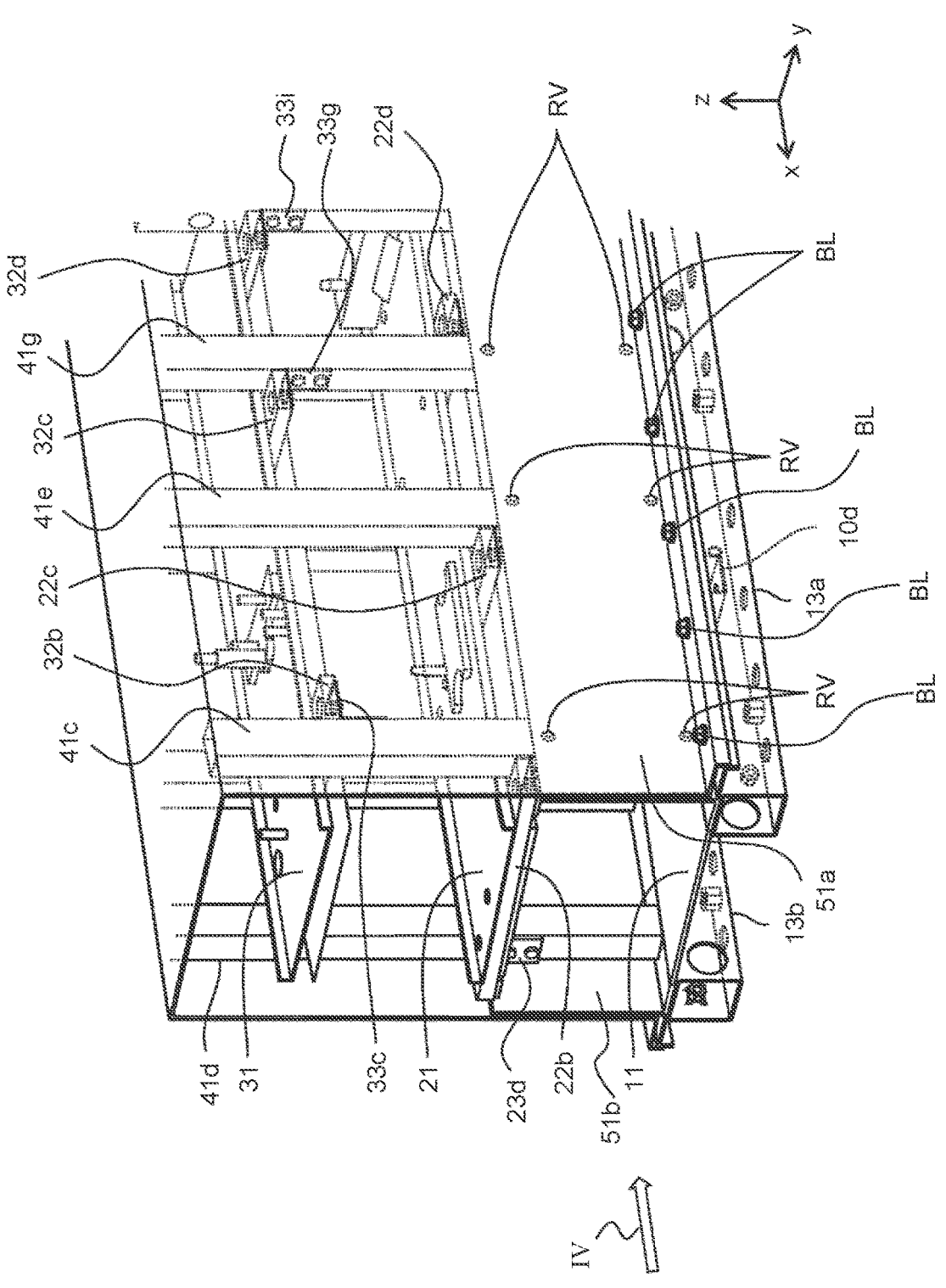
FIG. 3 is a view showing the detailed configuration of the battery case shown in FIG. 1.
Figure 4:
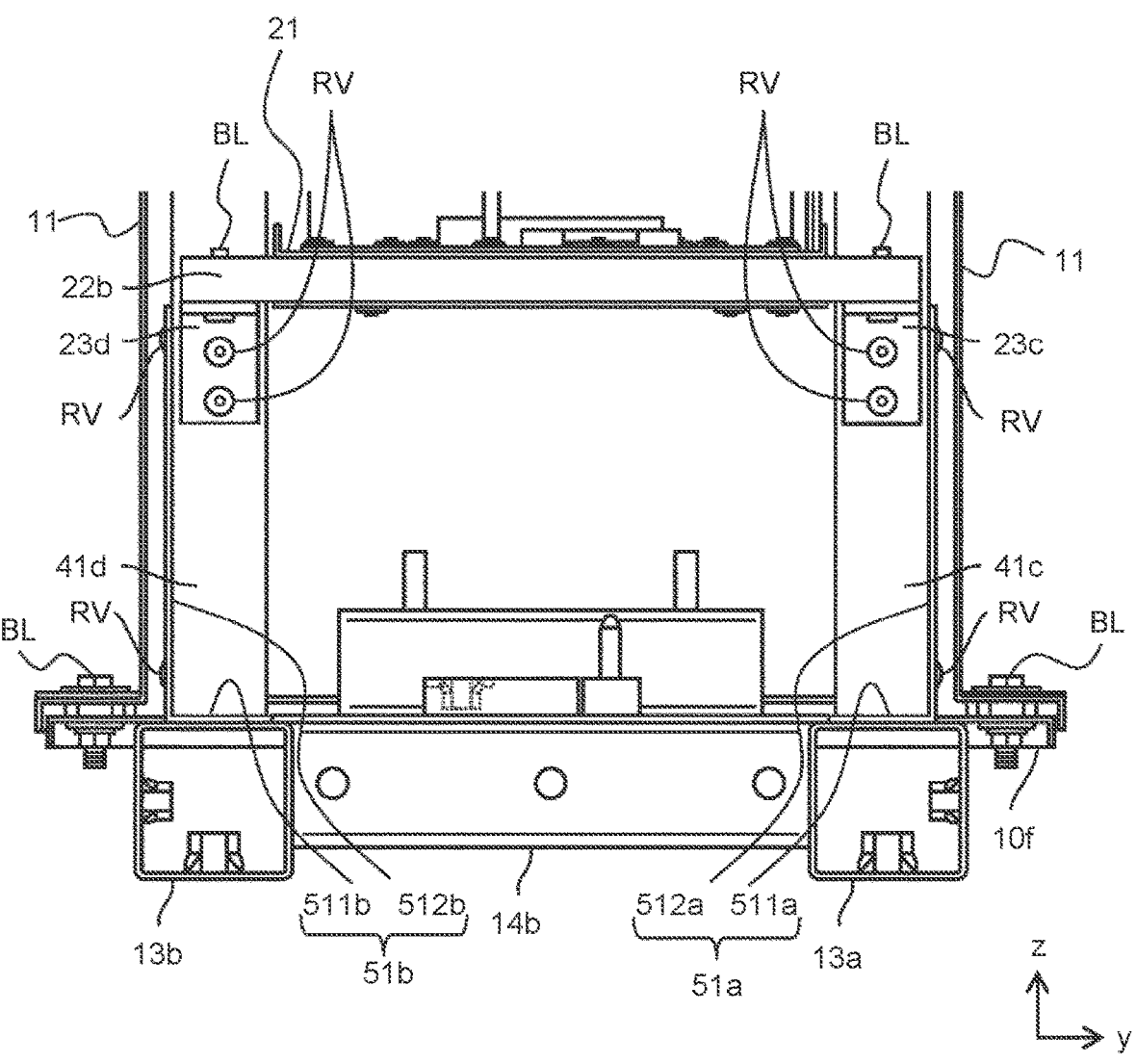
FIG. 4 is a view showing the detailed configuration of the battery case shown in FIG. 1.

FIG. 3 is a view of the battery case shown in FIG. 1 as cut along line indicated in FIG. 1. FIG. 4 is a view of the battery case shown in FIG. 3 as seen from the direction of arrow IV. In FIGS. 3 and 4, for the convenience of description, the battery stacks in the first tier and the second tier are omitted. In addition, in FIG. 4, the part up from an intermediate point in the second tier is omitted.

As shown in FIG. 1, 3, or 4, the plate 21 is supported by support members (middle-tier support members) 22*a* to 22*e*. In addition, as shown in FIG. 4, the support member 22*b* is mechanically joined (with bolts BL or rivets RV) to the support pillar member 41*c* through an L-shaped bracket 23*c* and, at the same time, mechanically joined to the support pillar member 41*d* through an L-shaped bracket 23*d*. The L-shaped brackets 23*c*, 23*d* are general-purpose metal pieces. As with the support member 22*b*, the support members 22*a*, 22*c* to 22*e* are respectively joined to a total of four pairs of support pillar members 41 through a total of eight L-shaped brackets (an L-shaped bracket 23*a* etc.). Thus, the rigidity of the support members 22*a* to 22*e* in the y-axis direction of the support pillar members 41 (i.e., the left-right direction of the battery case) is enhanced.

As shown in FIG. 1, 3, or 4, the plate 31 is supported by support members (upper-tier support members) 32*a* to 32*d*. A support structure for the plate 31 is basically the same as that for the plate 21 and can be understood from FIG. 2 in addition to FIG. 3. As shown in FIG. 2 or 3, the support member 32*b* is mechanically joined to the support pillar member 41*c* through an L-shaped bracket 33*c* and, at the same time, mechanically joined to the support pillar member 41*d* through an L-shaped bracket (not shown). The L-shaped bracket 33*c* is the same metal piece as the L-shaped brackets 23*c*, 23*d*. As with the support member 32*b*, the support members 32*a*, 32*c*, 32*d* are respectively joined to a total of three pairs of support pillar members 41 through a total of six L-shaped brackets (L-shaped brackets 33*a*, 33*g*, 33*i*, etc.). Thus, the rigidity of the support members 32a to 32d in the y-axis direction of the support pillar members 41 is enhanced.

As shown in FIG. 1, 3, or 4, the L-shaped plate 51a is located inside the battery cover 11. The L-shaped plate 51a is located on the left side of the battery stack housed in the first tier, and corresponds to the "left L-shaped plate" in this disclosure. The L-shaped plate 51a is formed by, for example, a general-purpose L-shaped steel member. The L-shaped plate 51a is composed of a bottom part 511a and a wall part 512a.

The bottom part 511a is located between the respective base ends of the support pillar members 41a, 41c, 41e, 41g, 41i and the bottom plate 12. The bottom part 511a is joined to the bottom plate 12 (by arc welding or the like) but is not joined to the respective base ends of the support pillar members 41a, 41c, 41e, 41g, 41i. This is because, while the bottom part 511a and the bottom plate 12 are similar to each other in material, the bottom part 511a and the support pillar member 41a etc. are different from each other in material. As the bottom part 511a is joined to the bottom plate 12, the rigidity of the bottom plate 12 and the L-shaped plate 51a in the x-axis, y-axis, and z-axis directions is enhanced.

The wall part 512a rises from the bottom part 511a and extends in the z-axis direction (i.e., the vertical direction). The wall part 512a is placed against respective outer lateral surfaces of the support pillar members 41a, 41c, 41e, 41g, 41i. The respective outer lateral surfaces of the support pillar members 41a, 41c, 41e, 41g, 41i correspond to the "left outer lateral surfaces" in this disclosure. The wall part 512a and each of the outer lateral surfaces of the support pillar member 41a etc. are mechanically joined together (with rivets RV). Thus, the rigidity of the support pillar members 41a, 41c, 41e, 41g, 41i in the x-axis and y-axis directions is enhanced.

The L-shaped plate 51b is disposed opposite to the L-shaped plate 51a. The L-shaped plate 51b is located on the right side of the battery stack housed in the first tier, and corresponds to the "right L-shaped plate" in this disclosure. The configuration of the L-shaped plate 51b is basically the same as that of the L-shaped plate 51a. That is the L-shaped plate 51b is formed by a general-purpose L-shaped steel member and composed of a bottom part 511b and a wall part 512b.

In addition, the bottom part 511b is located between the respective base ends of the support pillar members 41b, 41d, 41f, 41h, 41j and the bottom plate 12 and joined to the bottom plate 12. The wall part 512b is placed against respective outer lateral surfaces of the support pillar members 41b, 41d, 41f, 41h, 41j and mechanically joined to the respective outer lateral surfaces of the support pillar member 41b etc. The respective outer lateral surfaces of the support pillar members 41b, 41d, 41f, 41h, 41j correspond to the "right outer lateral surfaces" in this disclosure.

3. Effects

In the battery case according to the embodiment having been described above, the members constituting the inside of the battery case are joined to or combined with each other so as to enhance the rigidity of these members. Thus, a battery case having high strength is provided. Therefore, even when disposed outdoors, the battery case can appropriately protect the battery stack or the electronic component against external forces. In addition, in the battery case according to the embodiment, general-purpose members are used for many of the members constituting the inside of the battery case, which makes it possible to reduce the cost of the battery case.

What is claimed is:

1. A battery case that houses a battery stack, comprising:
at least four support pillar members that are disposed so as to correspond to at least four corners of the battery stack and each extend in a vertical direction;
a bottom plate that is disposed on a base end side of the at least four support pillar members and supports the battery stack and the at least four support pillar members; and
a plurality of L-shaped plates each comprising a bottom part and a wall part that rises from the bottom part, the bottom parts located between base ends of the at least four support pillar members and the bottom plate, the wall parts contacting at least four outer lateral surfaces belonging to the respective at least four support pillar members, wherein:
the at least four outer lateral surfaces include at least two left outer lateral surfaces located on a left side of the battery stack and at least two right outer lateral surfaces located on a right side of the battery stack;
the plurality of L-shaped plates include a left L-shaped plate located on the left side of the battery stack and a right L-shaped plate located on the right side of the battery stack;
the left L-shaped plate is placed against the at least two left outer lateral surfaces, and the right L-shaped plate is placed against the at least two right outer lateral surfaces;
the bottom plate and each of the bottom parts of the left and right L-shaped plates are joined together;
the wall part of the left L-shaped plate and the at least two left outer lateral surfaces are joined together; and
the wall part of the right L-shaped plate and the at least two right outer lateral surfaces are joined together.

2. The battery case according to claim 1, further comprising:
a pair of reinforcing members that is provided on a lower surface of the bottom plate disposed opposite the at least four support pillar members, the pair of reinforcing members extending in a longitudinal direction of the battery stack; and
an additional reinforcing member that extends between the pair of reinforcing members in a direction orthogonal to the longitudinal direction, wherein
the lower surface of the bottom plate and each of the pair of reinforcing members and the additional reinforcing member are joined together.

3. The battery case according to claim 1, further comprising:
an upper-tier plate that is provided above the bottom plate and supports an electronic component that controls charge and discharge of the battery stack; and
at least two upper-tier support members that extend in a direction orthogonal to a longitudinal direction of the battery stack and support the upper-tier plate, wherein:
the at least four support pillar members include at least two pairs of support pillar members, each of the at least two pairs of support pillar members including a first support pillar member and a second support pillar member aligned with the first support pillar member in the direction orthogonal to the longitudinal direction; and
each of the at least two pairs of support pillar members is coupled together through the at least two upper-tier support members.

4. The battery case according to claim 3, further comprising:

a middle-tier plate that is provided between the bottom plate and the upper-tier plate and supports an additional battery stack; and at least two middle-tier support members that extend in the direction orthogonal to the longitudinal direction and support the middle-tier plate, wherein each of the at least two pairs of support pillar members is coupled together through the at least two middle-tier support members.

5. The battery case according to claim 1, wherein:

the bottom plate and each of the bottom parts of the left and right L-shaped plates are welded together;

the wall part of the left L-shaped plate and the at least two left outer lateral surfaces are mechanically joined together; and the wall part of the right L-shaped plate and the at least two right outer lateral surfaces are mechanically joined together.

\* \* \* \* \*